(12) United States Patent
Rohaut et al.

(10) Patent No.: US 8,092,913 B2
(45) Date of Patent: Jan. 10, 2012

(54) HYDROPHOBIC COATING COMPRISING A PRIMING INCLUDING A BIS-SILANE AND A HYDROPHOBIC LAYER INCLUDING A FLUORINATED ALKYSILANE

(75) Inventors: Nathalie Rohaut, Saint-Prix (FR); Arnaud Huignard, Paris (FR); Anne Berend Dros, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 780 days.

(21) Appl. No.: 11/996,688

(22) PCT Filed: Jul. 21, 2006

(86) PCT No.: PCT/FR2006/050741
§ 371 (c)(1),
(2), (4) Date: Jun. 16, 2008

(87) PCT Pub. No.: WO2007/012779
PCT Pub. Date: Feb. 1, 2007

(65) Prior Publication Data
US 2009/0214809 A1     Aug. 27, 2009

(30) Foreign Application Priority Data
Jul. 26, 2005   (FR) ..................... 05 52309

(51) Int. Cl.
*B05D 1/36* (2006.01)
*B05D 3/02* (2006.01)
*B32B 17/06* (2006.01)

(52) U.S. Cl. ................. 428/429; 427/387; 427/389.7; 427/393.6; 427/407.2; 428/333; 428/428; 428/447; 428/448; 428/451

(58) Field of Classification Search .......... 428/333, 428/428, 429, 447, 448, 451; 427/387, 389.7, 427/393.6, 407.2
See application file for complete search history.

(56) References Cited

U.S. PATENT DOCUMENTS

| | | | |
|---|---|---|---|
| 5,800,918 A | 9/1998 | Chartier et al. | 428/336 |
| 6,183,872 B1 * | 2/2001 | Tanaka et al. | 428/429 |
| 6,258,156 B1 | 7/2001 | Azzopardi et al. | 106/287.14 |
| 6,340,502 B1 | 1/2002 | Azzopardi et al. | 427/387 |
| 6,451,432 B1 | 9/2002 | Azzopardi et al. | 428/429 |
| 6,521,334 B1 * | 2/2003 | Ogawa et al. | 428/333 |

FOREIGN PATENT DOCUMENTS

| | | |
|---|---|---|
| EP | 0 492 545 A2 | 7/1992 |
| EP | 0 759 413 A1 | 2/1997 |
| EP | 1 102 825 | 5/2001 |
| EP | 1 229 085 A1 | 8/2002 |
| EP | 1 102 825 B1 | 9/2003 |
| JP | 9157582 | 6/1997 |
| JP | 2005-508420 | 3/2005 |

OTHER PUBLICATIONS

U.S. Appl. No. 10/590,197, filed Aug. 22, 2006, Duran, et al.
Foreign Office Action dated May 10, 2011 as received in the corresponding Japanese Patent Application No. 2008-523424 w/English Translation.

* cited by examiner

*Primary Examiner* — Dhirajlal S. Nakarani
(74) *Attorney, Agent, or Firm* — Oblon, Spivak, McClelland, Maier & Neustadt, L.L.P.

(57) ABSTRACT

The invention provides a process for obtaining a hydrophobic/oleophobic coating on a substrate of a glass, ceramic or vitroceramic material by applying a priming layer obtained from a priming agent of formula: $(X^1)_{3-q}(R^1)_q Si-R^3-Si(X^2)_{3-q'}(R^2)_{q'}$, the variables of which are defined in the specification and then depositing a hydrophobic coating containing a fluorinated alkylsilane.

12 Claims, No Drawings

HYDROPHOBIC COATING COMPRISING A PRIMING INCLUDING A BIS-SILANE AND A HYDROPHOBIC LAYER INCLUDING A FLUORINATED ALKYSILANE

CROSS-REFERENCE TO RELATED APPLICATIONS

The present application is the U.S. counterpart of WO 07/012779, the text of which is incorporated by reference and claims the priority of French patent application No. 05/52309, filed on Jul. 26, 2005, the text of which incorporated by reference.

BACKGROUND OF THE INVENTION

Field of the Invention

The present invention relates to the hydrophobic/oleophobic treatment of a substrate, especially constituted by a glass, ceramic, vitroceramic, etc. material.

The glazing according to the invention is, for example, glazing made of glass. It is used, in particular, in the aeronautics, railway or automotive fields. It may also be used in the construction field or in the interior furnishing field, for instance decorative panels, for furnishing, household electrical goods (refrigerator doors, oven doors, windowpanes), etc.

This type of treatment is directed, in a known manner, toward giving the substrate the non-wettability character also known as rain repellency.

Description of the Background

The term "wettability" denotes the property according to which polar or nonpolar liquids adhere to the substrate and form an impeding film, and also the tendency of a substrate to retain dust or soiling of any nature, finger marks, insects, etc.

The presence of water and/or soiling is a nuisance in particular for a transparent substrate of the glazing type, especially used in the transportation field.

The non-wettability property of a substrate, more commonly referred to as the hydrophobicity/oleophobicity, is proportionately greater the higher the contact angles between a hydrophilic or oleophilic liquid and this substrate, for example at least 90° for water. The liquid then has a tendency to flow easily, in the form of drops, on the substrate, by simple gravity if the substrate is inclined, or under the effect of aerodynamic forces in the case of a vehicle in motion. Known agents for imparting this hydrophobicity/oleophobicity property are, for example, fluorinated alkylsilanes as described in patent applications EP 0 492 417, EP 0 492 545 and EP 0 672 779. According to these documents, this layer may be obtained by applying to the surface of a substrate a solution containing fluorinated organosilanes in a nonaqueous organic solvent. As nonaqueous organic solvent, document EP 0 492 545 in particular mentions n-hexadecane, toluene, xylene, etc. These solvents are particularly suitable for a fluorinated chlorosilane. It is also possible, according to said document, to use a methyl or ethyl alcohol as solvent when the fluorinated silane is a fluorinated alkoxysilane.

Common hydrophobic/oleophobic agents are, in particular, alkylsilanes in which the alkyl group comprises at least one perfluorinated end, i.e. consisting of a group $F_3C-(CF_2)_n-$, in which n is a positive integer or zero. For these, patent application EP 0 719 743 indicates perfluorinated carbons and suitable solvents.

One of the problems most acutely perceived in the field of the invention is firstly that of abrasion of the hydrophobic/oleophobic coating. This abrasion takes place to a greater or lesser extent in the course of cleaning of the substrate, which is periodically essential in particular for restoring satisfactory vision through a transparent substrate. It is therefore continually sought to slow down the gradual removal of the hydrophobic/oleophobic coatings of the abovementioned types, which takes place especially under the action of windshield wipers in the case of a motor vehicle windshield. Moreover, such a removal may also result from degradation by ultraviolet radiation.

It is also known practice from the abovementioned patent application EP 0 492 545 A2 to increase the adhesion of the hydrophobic/oleophobic coating by subjecting the substrate to a priming treatment before applying the coating. This treatment consists in forming a thin intermediate layer using "priming agents" or "primers", which are silicon compounds containing at least two hydrolyzable functions. In a known manner, one of the two hydrolyzable functions enables chemical bonding to the substrate via an oxygen atom linked to the silicon atom; the second hydrolyzable function enabling the fixing of the hydrophobic/oleophobic agent. The compounds $SiCl_4$, $SiHCl_3$, $SiH_2Cl_2$ and $Cl-(SiCl_2O)_n SiCl_3$, n being an integer between 1 and 4, are mentioned in patent application EP 0 492 545 A2 as priming agents.

Patent EP 944 687 more particularly describes rain-repellent coatings developed via a liquid route and comprising a priming layer or sublayer based on silica sol-gel obtained from a precursor of the $Si(OEt)_4$ or $SiCl_4$ type and a functional layer based on perfluoroalkylsilane.

In order to further improve the mechanical strength properties of the hydrophobic coating, patent EP 1 102 825 describes a composition for a hydrophobic/oleophobic coating incorporating in the same layer both a fluorinated alkylsilane and a bis-silane.

However, although such sublayers make it possible to obtain performance qualities that are in accordance with the vast majority of the current UV and mechanical strength specifications, for instance those imposed by motor vehicle constructors, especially with respect to abrasion, they do not generally have sufficient chemical inertness typically allowing them to satisfy salt corrosion resistance criteria.

In particular, the tests conducted by the Applicant have demonstrated that, in the majority of cases, such coatings have difficulty in satisfying the technical specifications imposed in the field by motor vehicle constructors and measured, for example, via the Neutral Saline Fog (NSF) resistance test according to standard NF ISO 9227. Thus, the coatings described in patent applications EP 944 687 and EP 1 102 825, the UV-resistance and mechanical strength properties of which were found to be satisfactory, show insufficient saline corrosion performance, as measured by the NSF test. This insufficiency may limit their development, in particular in the Asiatic market where the standards are tighter in this field.

BRIEF SUMMARY OF THE INVENTION

The main subject of the present invention is coatings that are not only resistant to abrasion and to UV radiation, but also show substantial chemical inertness, i.e. typically allowing them to satisfy the technical specifications currently imposed by the automotive industry, both in terms of abrasion and UV resistance and saline corrosion resistance. The coatings according to the present invention also have performance qualities substantially equal to those of the coatings known at the present time as regards the other specifications necessary for their various uses, for instance mechanical strength, water resistance, etc.

DETAILED DESCRIPTION OF THE INVENTION

To this end, according to a first aspect, a subject of the invention is a process for obtaining a hydrophobic/oleophobic coating on a substrate preferably constituted of a glass, ceramic or vitroceramic material, said process being characterized in that it comprises:

a) a first step that consists in applying to said substrate a first priming layer obtained from a priming agent of formula:

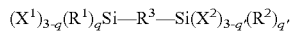

in which
Si is silicon;
$R^3$ represents a linear, branched or aromatic, preferably linear, carbon-based chain in which the number of carbons establishing the bond between the two silicon atoms is less than 6 and is preferably between 1 and 4;
$R^1$ and $R^2$ each represent an alkyl group or a hydrogen atom;
$X^1$ and $X^2$ are identical or different hydrolyzable groups;
q and q' are equal to 0 or 1 and are preferably 0, and b) a second step of depositing onto said first layer a hydrophobic coating comprising at least one fluorinated alkylsilane.

For the purposes of the present description, the expression "number of carbons establishing the bond between two silicon atoms" means the smallest number of carbon atoms allowing the linear junction between two silicon atoms, rather than the total number of carbon atoms placed between the two silicons. This definition is especially relevant when a branched or aromatic-ring group is present therebetween. By way of example, this number of carbons is equal to 8 in the case of the bis-silylethylbenzene described in example 8.

In general, $X^1$ and $X^2$ are alkoxy groups, preferably methoxy or ethoxy, or halide groups.

The step of depositing the hydrophobic coating is performed, for example, using a solution obtained from a perfluoroalkylsilane of the type represented by the general formula:

$$F_3C-(CF_2)_m-(CH_2)_n-Si(X)_{3-p}(R)_p$$

in which:
m=0 to 15, preferably 5 to 9;
n=1 to 5, preferably n=2;
p=0, 1 or 2, preferably 0 or 1 and most preferably 0;
R is an alkyl group or a hydrogen atom; and
X is a hydrolyzable group such as a halide group or an alkoxy group.

According to one alternative mode, the step of depositing the hydrophobic coating is performed using a solution obtained from a perfluoroalkylsilane of the perfluoropolyethersilane type, as described, for example, in patent EP 844 265 or in patent application US 2004/0 247 886 or patent U.S. Pat. No. 6,649,272 B2.

Preferably, said perfluoropolyethersilane is of the type represented by the general formula:

or by the general formula

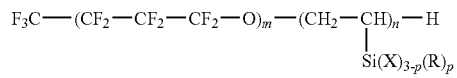

in which:
m=2 to 30;
n=1 to 3, preferably n=1;
p=0, 1 or 2, preferably 0 or 1 and most preferably 0;
R is an alkyl group or a hydrogen atom; and
X is a hydrolyzable group such as a halide group or an alkoxy group.

According to a second aspect, the present invention relates to the hydrophobic coating that may be obtained by performing the process as described previously.

The invention more particularly relates to a hydrophobic coating for a glass, ceramic or vitro-ceramic substrate, and comprising:
a priming layer directly applied onto said substrate and comprising groups Si—$R^3$—Si, $R^3$ being chosen from the group constituted by linear, branched or aromatic, preferably linear, alkyl chains in which the number of carbon atoms establishing the bond between the two silicon atoms is less than 6 and is preferably between 1 and 4,
a coating layer in connection with said priming layer and comprising an alkylsilane with a hydrophobic/oleophobic perfluorinated end.

According to a first mode, said alkylsilane is of the type represented by the general formula:

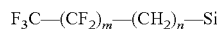

with:
m=0 to 15, preferably 5 to 9;
n=1 to 5, preferably n=2.

According to a second mode, said alkylsilane comprises a group of the perfluoropolyether type. Preferably, said alkylsilane is of the type represented by the general formula:

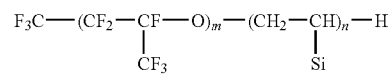

or by the general formula:

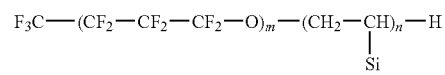

in which
m=2 to 30,
n=1 to 3, preferably n=1.

The hydrophobic layer may also comprise or may be constituted by a mixture of an alkylsilane with a perfluorinated end according to the first mode and of an alkylsilane comprising a perfluoropolyether group according to the second mode, as described, for example, in patent application EP 1 229 085.

For example, the thickness of the priming layer is between 1 and 20 nm and preferably between 2 and 5 nm.

The thickness of the coating layer may be between 1 and 10 nm and preferably between 1 and 5 nm.

Another subject of the invention consists of a product whose outer surface, usually constituted by a glass, ceramic or vitroceramic material or a natural mineral material, is at least partly equipped with a hydrophobic/oleophobic coating as described previously or obtained from a process as described previously.

The product of the invention is, for example, monolithic, laminated or multiple glazing.

It is pointed out that these terms are defined as follows:
"monolithic glazing": glazing constituted by a single pane of glass;
"laminated glazing": a stack of several panes solidly fastened together, for example of glass or plastic panes fixed together by means of polyvinyl butyral, polyurethane, etc. adhesive layers; and
"multiple glazing": an assembly of disjointed panes, i.e. of panes especially separated from each other by layers of air.

The advantage of the hydrophobic/oleophobic coating of the invention for products of this type is twofold. Firstly, it allows drops of water or of other liquid to flow on vertical or inclined surfaces, under the effect, as the case may be, of aerodynamic forces, for example in the case of a vehicle in motion. Furthermore, these drops that flow incorporate soiling and entrains it. The visibility through the glazing is improved to a degree such that, in certain cases, cleaning devices (windshield washers, windshield wipers) may be dispensed with.

Finally, a subject of the invention is also the applications of the product described previously:
- as glazing for a transportation vehicle (motor vehicle side windows, aviation or motor vehicle windshield) or for buildings;
- as vitroceramic cooking hobs or oven doors;
- as a component of urban furnishing, especially such as a bus shelter component; and
- as a furnishing component, especially such as a mirror, a storage tray, a tray for a household electrical appliance such as a refrigerator, a shower cabin component or a partition wall;
- as a screen, especially a television screen, a touch screen or a plasma screen.

The examples that follow serve to illustrate the invention without, however, limiting its scope, in any of the described aspects.

In these examples, all the percentages are given on a mass basis.

EXAMPLE 1

According to this example, a first sample E1 in accordance with the invention is prepared.

0.3% of bis(triethoxysilyl)ethane $(CH_3O)_3Si(CH_2)_2Si(OCH_3)_3$ is added to a solution comprising 90% isopropanol and 10% 0.3N hydrochloric acid.

In parallel, a solution containing 3% of perfluoro-decyltriethoxysilane $CF_3(CF_2)_7(CH_2)_2Si(OC_2H_5)_3$ in an isopropanol (90%)/0.3N hydrochloric acid (10%) mixture is prepared. The two solutions are stirred for 15 minutes.

According to a first deposition step, the bis(tri-ethoxysilyl)ethane-based solution is then deposited by wiping (4 crossed sweeps) over the air face of a glass substrate polished beforehand using a cerium oxide solution and then rinsed thoroughly with demineralized water. The thickness of the priming layer thus obtained is about 4 nm.

Once the sublayer has been deposited, the perfluoro-decyl-triethoxysilane solution is in turn deposited via the same wiping technique. In this example and in the following examples, the deposition of the various layers is performed via the well-known technique of wiping, in which the material or its precursor is deposited by means of a soaked cloth. Needless to say, it would not, however, constitute a departure from the scope of the invention if the deposition were to be performed by any other technique known for this purpose in the field, in particular by spraying, which moreover allows better control of the thickness of the layers, by centrifugation, according to processes known in the art under the term "spin-coating", by dip-coating or by flow-coating.

After a leave-on time of 15 minutes at room temperature, the excess fluorosilane is removed by cleaning with isopropanol. The thickness of the layer obtained is about 4 nm.

As a variant, another sample E2 was prepared using the same reagents and techniques, the difference being that the successive depositions were performed this time on the tin face of the glass substrate.

EXAMPLE 2

The same steps as previously are repeated for the preparation of a second sample E3, but the glass substrate is treated this time on its air face with a priming solution of $Si(OCH_3)_4$ at 0.4% by weight in a solution of 90% by weight of ethanol and 10% by weight of water, during the first deposition step.

The substrate thus coated with the sublayer is then placed in contact at room temperature with a solution containing 3% of $CF_3(CF_2)_7(CH_2)_2Si(OC_2H_5)_3$ in a mixture of 90% ethanol and 10% water, acidified with 0.3N HCl.

EXAMPLE 3

A third sample E4 is prepared according to a method identical to the previous methods and in accordance with the teachings of patent EP 1 102 825.

The glass substrate, identical to the one used in the preceding examples and having undergone the same preparation on its air face, is treated with a priming solution of $Si(OCH_3)_4$ at 0.4% by weight in a solution of 90% by weight of ethanol and 10% by weight of water.

The substrate and its priming are then placed in contact at room temperature with a solution of $CF_3(CF_2)_7(CH_2)_2Si(OC_2H_5)_3$ and $(CH_3O)_3Si(CH_2)_2Si(OCH_3)_3$ in respective proportions of 3% and 1% by weight in a mixture of 90% by weight of ethanol and 10% by weight of water, acidified with 0.3N HCl.

EXAMPLE 4

The four samples E1, E2, E3 and E4 prepared according to examples 1 to 3 are evaluated according to the following criteria:
1) measurement of the initial contact angle of water, which gives a reference indication of the hydrophobic nature of the grafted substrate;
2) the abrasion resistance, obtained by measuring the residual contact angle of water on the sample after the grafted hydrophobic/oleophobic coating has undergone abrasion according to two different tests:
   a) the Opel® friction test, performed on the samples with a felt of hardness H1, a load of 0.4 kg/cm² on a surface of 1.5 cm², with a translation speed of 50 cycles/minute and a rotation speed of 6 rpm. A sample is judged to be satisfactory in the test if the contact angle remains greater than 80° after 5000 cycles;
   b) the Toyota® friction test, performed according to standard TSR7503G, with a load of 0.3 kg/cm² on a surface of 4 cm² with a translation speed of 40 cycles/minute and using a device manufactured by the company Daiei Kagaku Seiki. A sample is judged to be satisfactory if the contact angle remains greater than 80° after 1500 cycles;
3) the UV-A radiation resistance, measured via tests of continuous illumination of the samples with a xenon lamp emitting UV radiation whose integrated lighting between 300 and 400 nm is 60 W/m². A sample is judged to be satisfactory in the test if the contact angle remains greater than 80° after 2000 hours of exposure;
4) the saline corrosion resistance, measured according to the Neutral Saline Fog (NSF) test as described according to standard NF ISO 9227. The test consists in spraying fine droplets of saline water (NaCl solution at 50 g/l, of pH=7) at a temperature of 35° C. The samples are inclined at 20° relative to the vertical. The strictest standard currently in force for an application on motor vehicle side windows demands a contact angle of water of greater than 70° after 300 test hours.

The results obtained for the samples prepared in accordance with examples 1 to 3 are collated in table 1:

TABLE 1

| Sample | Initial contact angle | Angle after Opel test (5000 cycles) | Angle after Toyota test (1500 cycles) | Angle after UV-A test (2000 hours) | Angle after NSF test 300 h | 600 h |
|---|---|---|---|---|---|---|
| E1 | 105° | >95° | >90° | >85° | >85° | >80° |
| E2 | 105° | >95° | >90° | >85° | >95° | >85° |
| E3 | 105° | >95° | <80° | >85° | <60° | <50° |
| E4 | 105° | >95° | <80° | >85° | <60° | <50° |

Comparison of the data collated in table 1 shows that the presence of a priming sublayer in accordance with the invention leads to initial rain-repellency properties of the treated surface that are identical to those obtained with the priming of the prior art.

Similarly, the abrasion- and UV-resistance properties are substantially identical, as shown by the results obtained in the Opel® test, the Toyota® test and the UV test on the various samples.

Samples E1 and E2 comprising the hydrophobic/oleophobic coating according to the invention show a saline corrosion resistance, measured via the NSF test, that is considerably better than that of the coatings known hitherto.

EXAMPLES 5 TO 8

These examples show the influence of the nature of the alkyl chain $R^3$ present between the two silicon atoms in the bis-silane used for the priming layer on the properties of the hydrophobic coating finally obtained. The experimental protocol is the same as that described in example 1, except that the precursor used to obtain the priming layer is replaced in the following manner.

Example 5: preparation of a sample E5 using bis(tri-ethoxysilyl)methane $(CH_3O)_3Si(CH_2)Si(OCH_3)_3$
Example 6: preparation of a sample E6 using bis(tri-ethoxysilyl)hexane $(CH_3O)_3Si(CH_2)_6Si(OCH_3)_3$
Example 7: preparation of a sample E7 using bis(tri-ethoxysilyl)octane $(CH_3O)_3Si(CH_2)_8Si(OCH_3)_3$
Example 8: preparation of a sample E8 using bis(tri-ethoxysilylethyl)benzene $(CH_3O)_3Si(CH_2)_2\text{-}\phi\text{-}(CH_2)_2Si(OCH_3)_3$, in which $\phi$ is a benzene ring.

The results obtained for the various tests are collated in table 2:

TABLE 2

| Sample | Initial contact angle | Angle after Opel test (5000 cycles) | Angle after Toyota test (1500 cycles) | Angle after UV-A test (2000 hours) | Angle after NSF test 300 h | 600 h |
|---|---|---|---|---|---|---|
| E5 | 105° | >95° | >90° | >85° | >90° | >80° |
| E6 | 105° | <70° | — | >85° | >95° | >85° |
| E7 | 105° | <70° | — | >85° | >95° | >85° |
| E8 | 105° | <80° | <60° | >85° | >85° | >75° |

It is noted that the increase in the length of the alkyl chain $R^3$ does not influence the saline corrosion resistance qualities. On the other hand, the abrasion resistance tests are less favorable when the linear carbon-based chain comprises 6 or more carbon atoms.

The invention claimed is:

1. A process for obtaining a hydrophobic/oleophobic coating on a substrate comprising a glass, ceramic or vitroceramic material, said process comprising:

a) applying to said substrate a first priming layer obtained from a priming agent of formula:

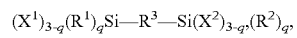

$(X^1)_{3-q}(R^1)_q Si\text{—}R^3\text{—}Si(X^2)_{3-q'}(R^2)_{q'}$ in which
   Si is silicon;
   $R^3$ represents a $CH_2$ or $(CH_2)_2$ linear carbon-based chain;
   $R^1$ and $R^2$ each represent an alkyl group or a hydrogen atom;
   $X^1$ and $X^2$ are identical or different hydrolyzable groups; and
   q and q' are equal to 0 or 1, and b) depositing onto said first layer a hydrophobic coating comprising at least one fluorinated alkylsilane.

2. The process as claimed in claim 1, in which $X^1$ and $X^2$ are alkoxy groups or halide groups.

3. The process as claimed in claim 1, wherein depositing the hydrophobic coating is performed with a solution obtained from a perfluoroalkylsilane of formula:

$F_3C\text{—}(CF_2)_m\text{—}(CH_2)_n\text{—}Si(X)_{3-p}(R)_p$ in which:
   m=0 to 15;
   n=1 to 5;
   p=0, 1 or 2;
   R is an alkyl group or a hydrogen atom; and
   X is a hydrolyzable group or an alkoxy group.

4. The process as claimed in claim 1, wherein depositing the hydrophobic coating is performed with a solution obtained from a perfluoropolyethersilane.

5. The process as claimed in claim 4, in which said perfluoropolyethersilane is of the formula:

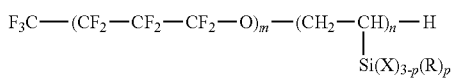

or of the formula

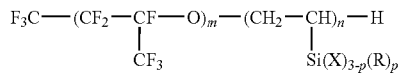

in which:
m=2 to 30;
n =1 to 3;
p =0, 1 or 2;
R is an alkyl group or a hydrogen atom; and
X is a hydrolyzable group or an alkoxy group.

6. A hydrophobic coating on the susbtrate obtained by a process as claimed in claim 1.

7. The hydrophobic coating as claimed in claim 6, in which the thickness of the coating layer is between 1 and 10 nm.

8. A product whose outer surface comprises a glass, ceramic or vitroceramic material, which is at least partly equipped with a hydrophobic/oleophobic coating comprising s priming layer on the outer surface comprising Si—$R^3$—Si groups, where in $R^3$ is $CH_2$ or $(CH)_2$ linear alkyl chain, and a layer on said priming layer and comprising an alkylsilane having a hydrophobic/oleophobic perfluorinated end group.

9. The product as claimed in claim 8, comprising a monolithic, a laminated or a multiple glazing.

10. A glazing for a transportation vehicle or for buildings comprising a product as claimed in claim 8.

11. A vitroceramic cooking hob or an oven door comprising a product as claimed in claim 8.

12. A component of urban furnishing, a furnishing component, a storage tray, a tray for a household electrical appliance, a shower cabin component or a partition wall, or a screen comprising a product as claimed in claim 8.

* * * * *